(12) United States Patent
Nishimura

(10) Patent No.: US 7,502,570 B2
(45) Date of Patent: Mar. 10, 2009

(54) IMAGE FORMING APPARATUS CAPABLE OF DETECTING AND/OR LOCATING A FAULT, IMAGE FORMING SYSTEM, AND METHOD OF CONTROLLING THE IMAGE FORMING APPARATUS

(75) Inventor: Shunsuke Nishimura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 11/466,859

(22) Filed: Aug. 24, 2006

(65) Prior Publication Data

US 2007/0070456 A1      Mar. 29, 2007

(30) Foreign Application Priority Data

Sep. 15, 2005   (JP)   ............... 2005-268690

(51) Int. Cl.
  *G03G 15/00*   (2006.01)
(52) U.S. Cl. ............................. 399/8; 399/9
(58) Field of Classification Search ............ 399/8, 399/9, 75, 91
  See application file for complete search history.

(56) References Cited

U.S. PATENT DOCUMENTS

| | | | |
|---|---|---|---|
| 5,289,147 A * | 2/1994 | Koike et al. | 399/9 |
| 5,490,089 A * | 2/1996 | Smith et al. | 399/9 |
| 7,136,605 B2 * | 11/2006 | Tsunoda et al. | 399/91 |
| 7,215,783 B2 * | 5/2007 | Tsunoda et al. | 399/91 |

FOREIGN PATENT DOCUMENTS

| | | |
|---|---|---|
| JP | 02-259666 A | 10/1990 |
| JP | 07-302019 A | 11/1995 |

\* cited by examiner

*Primary Examiner*—William J Royer
(74) *Attorney, Agent, or Firm*—Canon U.S.A., Inc. IP Division

(57) ABSTRACT

An image forming apparatus includes a memory for storing first sound information associated with a normal operating sound produced when the image forming apparatus normally operates, and a sensor for detecting an operating sound produced from the image forming apparatus and generating second sound information based on the detected operating sound. The image forming apparatus further includes a locating device for locating a fault in the image forming apparatus on the basis of the first sound information, the second sound information, and operation information associated with the image forming apparatus.

20 Claims, 9 Drawing Sheets

IMAGE FORMING APPARATUS CAPABLE OF DETECTING AND/OR LOCATING A FAULT, IMAGE FORMING SYSTEM, AND METHOD OF CONTROLLING THE IMAGE FORMING APPARATUS

BACKGROUND OF THE INVENTION

1. Field of the Invention

The present invention relates to an image forming apparatus that is capable of detecting and/or locating a fault therein, an image forming system, and a method of controlling the image forming apparatus.

2. Description of the Related Art

Japanese Patent Laid-Open No. 2-259666 discloses an image forming system in which an image forming apparatus is connected online to a management apparatus installed in a service center via a communication line such as a public line, and in which data on the image forming apparatus is transmitted and received by remote control.

In this image forming system, a plurality of image forming apparatuses at remote locations are managed by one management apparatus in a centralized manner. Information about operating conditions of the image forming apparatuses (including information about consumables, operating time, and jamming) is collected, and management information is used for maintenance operations of the image forming apparatuses. For example, the operating conditions include the number of copies, and the maintenance operations include an automatic call to the management apparatus on the basis of self diagnosis of each image forming apparatus, and adjustment of the components of the image forming apparatus in response to access from the management apparatus.

Japanese Patent Laid-Open No. 7-302019 discloses an image forming system that determines a fault as a maintenance operation by detecting sound produced in an image forming operation performed by an image forming apparatus. More specifically, detected sound information is transmitted to a management apparatus via a communication line, and is compared with prestored information about sound produced when the image forming apparatus normally operates. The management apparatus thereby determines the presence of a fault in the image forming apparatus, and notifies a serviceman of the fault in the event the fault is determined.

However, in the above-described image forming system, since the fault is determined only on the basis of sound information, determining a precise location of the fault may be difficult or impossible. As a result, a serviceman may be required to manually find (locate) the fault during a repair service visit, which can be time consuming. Furthermore, it may be difficult for the serviceman to find the fault in only one on-site repair operation.

SUMMARY OF THE INVENTION

At least one embodiment of the present invention provides an apparatus that is capable of locating a fault in an image forming apparatus based on sound information and operating information associated with the image forming apparatus.

An apparatus according to an aspect of the present invention includes a memory for storing first sound information associated with a normal operating sound produced when an image forming apparatus normally operates, a sensor for detecting an operating sound produced from the image forming apparatus and generating second sound information based on the detected operating sound, and a locating device for locating a fault in the image forming apparatus on the basis of the first sound information, the second sound information, and operation information associated with the image forming apparatus.

An image forming system according to another aspect of the present invention includes an image forming apparatus for forming an image on a sheet; a management apparatus coupled to the image forming apparatus via a network; a memory for storing first sound information associated with a normal operating sound produced when the image forming apparatus normally operates; a sound sensor for detecting an operating sound produced from the image forming apparatus and generating second sound information based on the detected operating sound; and a locating device for locating a fault in the image forming apparatus on the basis of the first sound information, the second sound information, and operation information associated with the image forming apparatus.

A method of controlling an image forming apparatus according to a further aspect of the present invention includes storing first sound information associated with a first operating sound produced when the image forming apparatus operates without a fault, detecting an operating sound produced from the image forming apparatus and generating second sound information based on the detected operating sound, and locating a fault in the image forming apparatus on the basis of the first sound information, the second sound information, and operation information associated with the image forming apparatus.

Further features of the present invention will become apparent from the following description of exemplary embodiments with reference to the attached drawings.

DESCRIPTION OF THE EMBODIMENTS

Exemplary embodiments of the present invention will be described in detail below with reference to the drawings.

Figure 1:
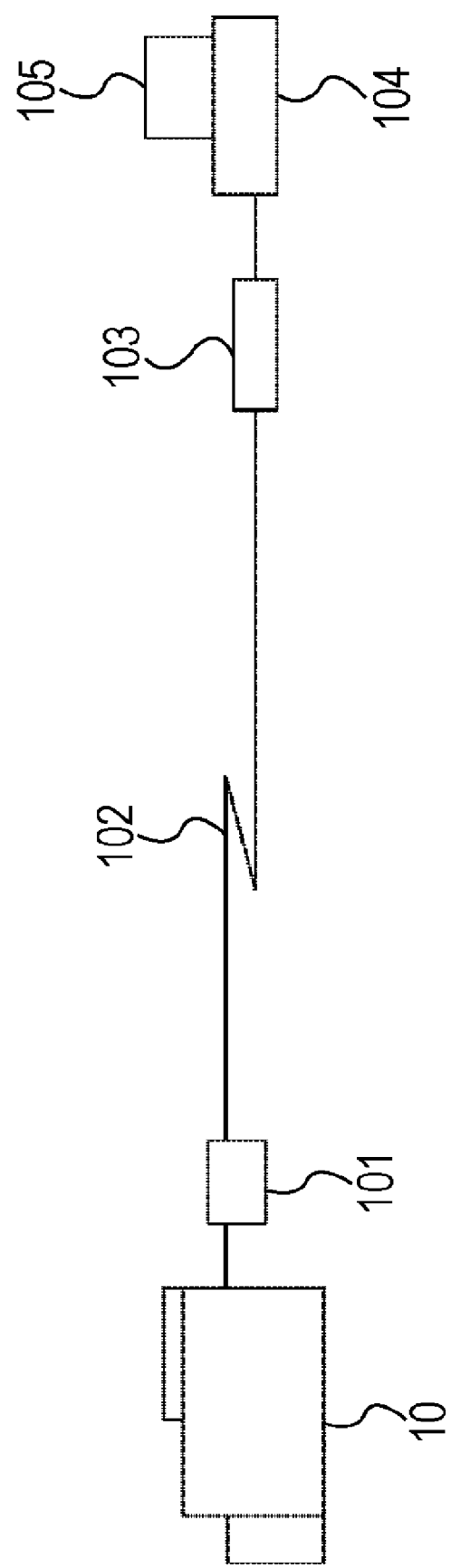
FIG. 1 is an explanatory view showing the overall configuration of an image forming system according to an embodiment of the present invention.

FIG. 1 shows the overall configuration of an image forming system according to an embodiment of the present invention. The image forming system includes an image forming apparatus 10, a communication control apparatus 101 that is connected to the image forming apparatus 10 and that transmits and receives data, a public line 102 serving as a communication line, a modem 103 that allows electronic information to be transmitted and received through the public line 102, a management apparatus 104 that stores and computes data obtained from the image forming apparatus 10, and a display apparatus 105 for displaying data.

Figure 2:
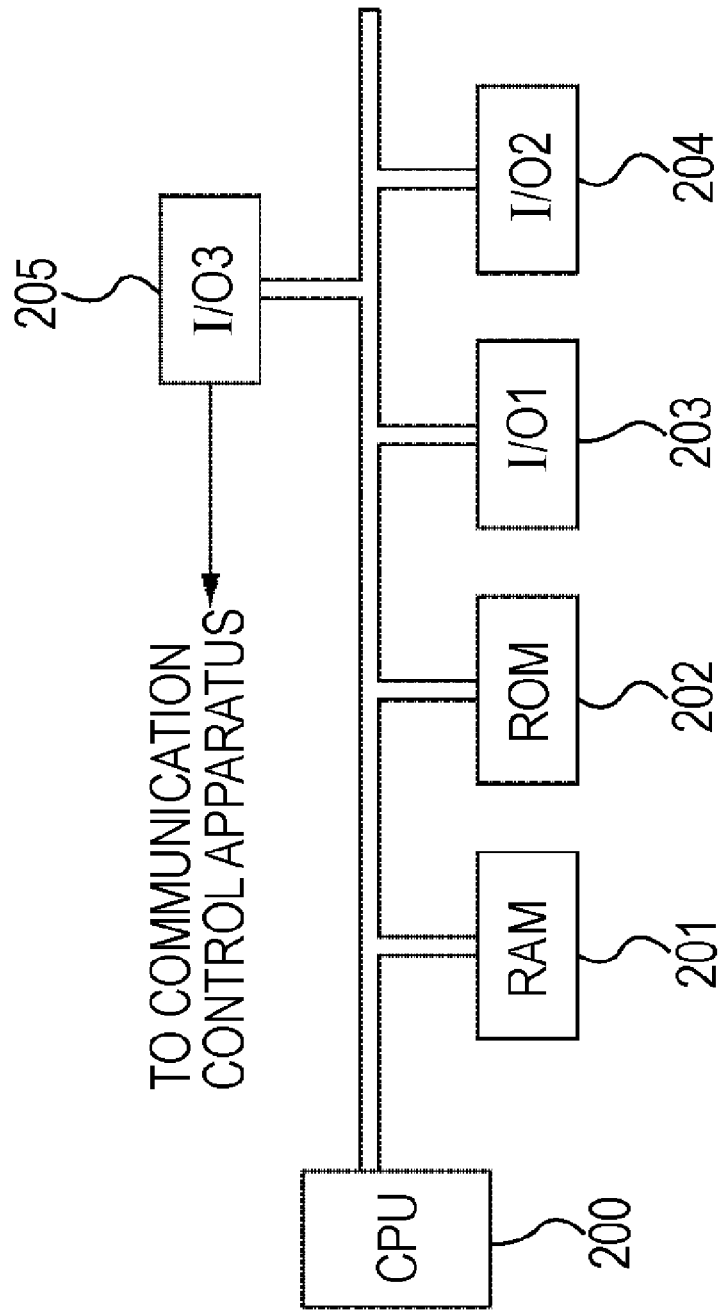
FIG. 2 is an explanatory view of a control system in an image forming apparatus adopted in the image forming system according to an embodiment of the present invention.

FIG. 2 shows a control system in the image forming apparatus 10 according to an embodiment of the present invention. The control system includes a CPU 200 that controls the entire image forming apparatus 10, a RAM 201 serving as a storage area for control data, a ROM 202 that stores a control program, I/O units 203 and 204 provided for sensor input and motor driving, and an I/O unit 205 provided for communication with the communication control apparatus 101.

Figure 3:
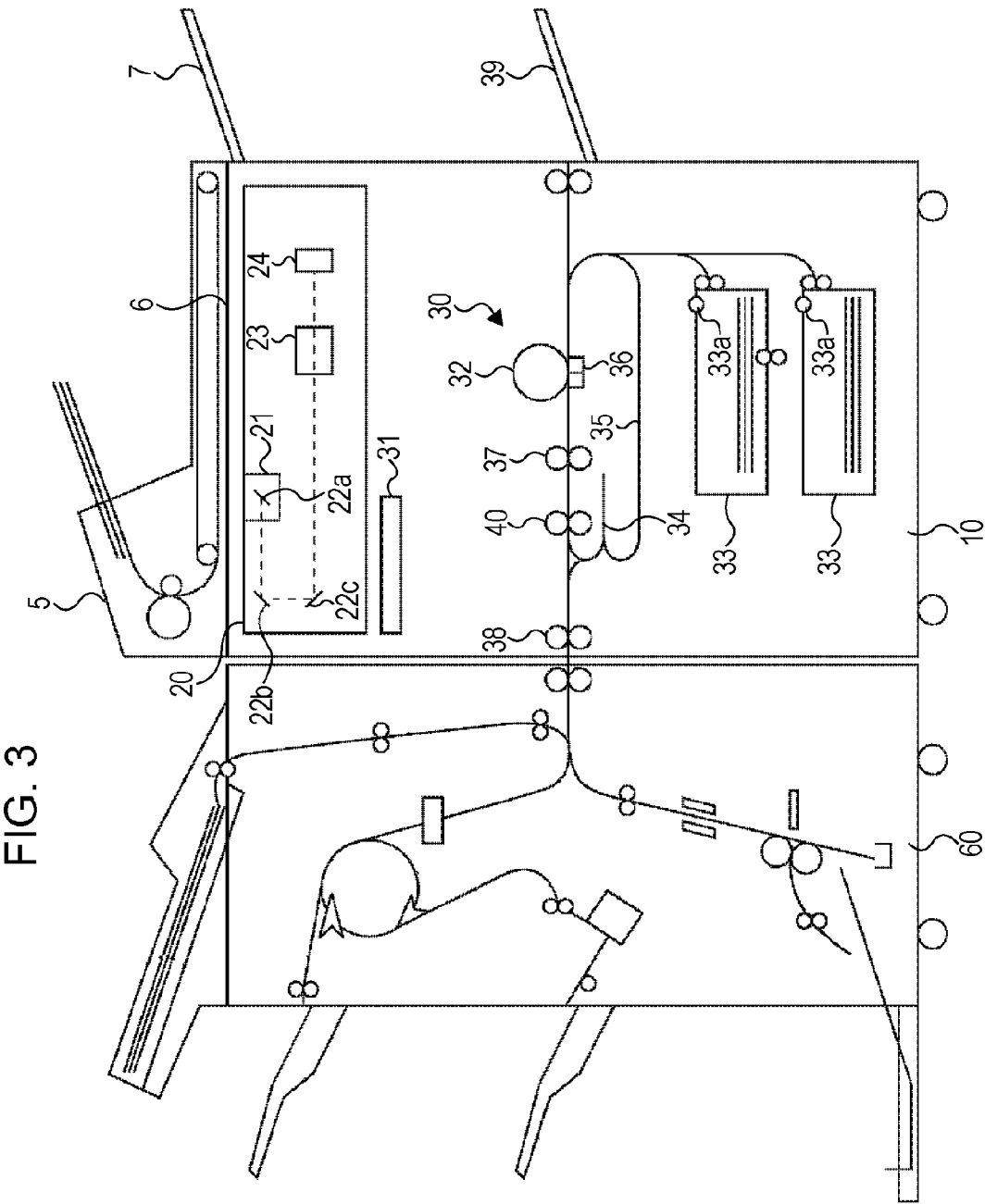
FIG. 3 is a longitudinal sectional view of the principal part of the image forming apparatus according to an embodiment of the present invention.

FIG. 3 is a longitudinal sectional view showing the principal part of the image forming system according to an embodiment of the present invention. The image forming apparatus 10 is connected to a finisher 60, and includes an image reader 20 for reading a document image, and a printer 30 serving as an image forming section.

An automatic document feeder 5 is mounted on the image reader 20. The automatic document feeder 5 supplies documents, which are placed face up on a document tray, leftward one by one from the first document. The supplied document is fed onto a platen glass 6 through a curved path, is conveyed from left to right via a reading position, and is then discharged to an external output tray 7.

When the document passes the reading position while being conveyed on the platen glass 6 from left to right, an image on the document is read by a scanner unit 21 held at a position corresponding to the reading position. This reading method is generally referred to as document flow reading. More specifically, when the document passes the reading position, a reading surface of the document is irradiated with light from a lamp (not shown) provided in the scanner unit 21, and reflected light from the reading surface is guided to a lens 23 via mirrors 22a, 22b, and 22c. The light passes through the lens 23, and is focused onto an imaging surface of an image sensor 24.

By thus conveying the document from left to right so as to pass through the reading position, document reading scanning is performed. In this case, the direction perpendicular to the feeding direction of the document is referred to as the main scanning direction, and the feeding direction of the document is referred to as the sub-scanning direction. That is, when the document that is being conveyed in the sub-scanning direction passes through the reading position, each line of the image on the document is optically read in the main scanning direction with the image sensor 24. The optically read image is converted into image data by the image sensor 24 and is then output. The image data output from the image sensor 24 is subjected to predetermined processing in an image signal control unit, and is then input as video signals to an exposure control unit 31 of the printer 30.

The document conveyed by the automatic document feeder 5 may be stopped at a predetermined position on the platen glass 6, and may be read by scanning the scanner unit 21 from left to right in this state. This reading method is referred to as document fixed reading.

When reading the document without using the automatic document feeder 5, first, the user lifts up the automatic document feeder 5, and places the document on the platen glass 6. The document is read by scanning the scanner unit 21 from left to right in this state. That is, document fixed reading is also performed when reading the document without using the automatic document feeder 5.

The exposure control unit 31 of the printer 30 modulates laser light according to input video signals, and outputs the modulated laser light. The laser light is applied onto a photosensitive drum 32 while being scanned by a polygon mirror. An electrostatic latent image is formed on the photosensitive drum 32 corresponding to the scanned laser light. During document fixed reading, the exposure control unit 31 outputs laser light to form an image that is not a mirror image.

The printer 30 also includes a plurality of sheet cassettes 33 storing sheets on which images are formed. The sheet cassettes 33 can be drawn forward from the image forming apparatus 10. Sheets can be supplied one by one from each of the sheet cassettes 33 to the printer 30 by a sheet separation and supply unit 33a provided corresponding to the sheet cassette 33. During double-sided copying, after an image is formed on the front side of a sheet, the sheet is reversed by a reverse path 34 and is supplied again to the printer 30 by a double-sided sheet feeding path 35 so that an image is formed on the back side of the sheet.

The electrostatic latent image on the photosensitive drum 32 is visualized as a developed image by a developer supplied from a developing device (not shown). A sheet is supplied from any of the sheet cassettes 33 or the double-sided sheet feeding path 35, and is conveyed between the photosensitive drum 32 and a transfer unit 36 in synchronization with the start of emission of laser light. The developed image is transferred from the photosensitive drum 32 onto the sheet by the transfer unit 36.

The sheet on which the developed image has been transferred is conveyed to a fixing unit 37. The fixing unit 37 fixes the developed image on the sheet by hot-pressing the sheet. After the sheet passes through the fixing unit 37, it is discharged from the printer 30 to the finisher 60 via feeding rollers 40 and discharging rollers 38.

In order to discharge the sheet with its image forming surface facing down (face down), the sheet is temporarily guided into the reverse path 34 by switching a flapper (not shown) provided at a junction with the reverse path 34 after passing through the fixing unit 37. After a rear edge of the sheet passes through the flapper, the sheet is switched back and is discharged from the printer 30 by the discharging rollers 38. Hereinafter, this discharging manner is referred to as reverse discharging. Reverse discharging is performed when images are sequentially formed from the first page, for example when read images are formed by using the automatic document feeder 5 or when images output from a computer are formed. The discharged sheets are in the right page order.

When an image is formed on a hard sheet, such as an OHP sheet, supplied from a manual sheet feeder 39, the sheet is not guided to the reverse path 34, but is discharged by the discharging rollers 38 with an image forming surface facing up (face up). This allows the printer 30 to form an image on a sheet that is prone to jamming, for example, a hard sheet.

In a double-sided recording mode in which an image is formed on each side of a sheet, the sheet is guided to the reverse path 34 by switching the flapper provided at the junction with the reverse path 34, and is then conveyed to the double-sided sheet feeding path 35. The CPU 200 exerts control so that the sheet guided to the double-sided sheet feeding path 35 is supplied again between the photosensitive drum 32 and the transfer unit 36 at a predetermined time.

The finisher 60 sequentially receives a plurality of sheets from the image forming apparatus 10, and performs post handling operations, such as aligning the sheets in a bundle, stapling, punching, sorting, non-sorting, and binding.

A description will now be given of a procedure for locating a fault in an image forming apparatus according to exemplary embodiments of the present invention.

Figure 4:
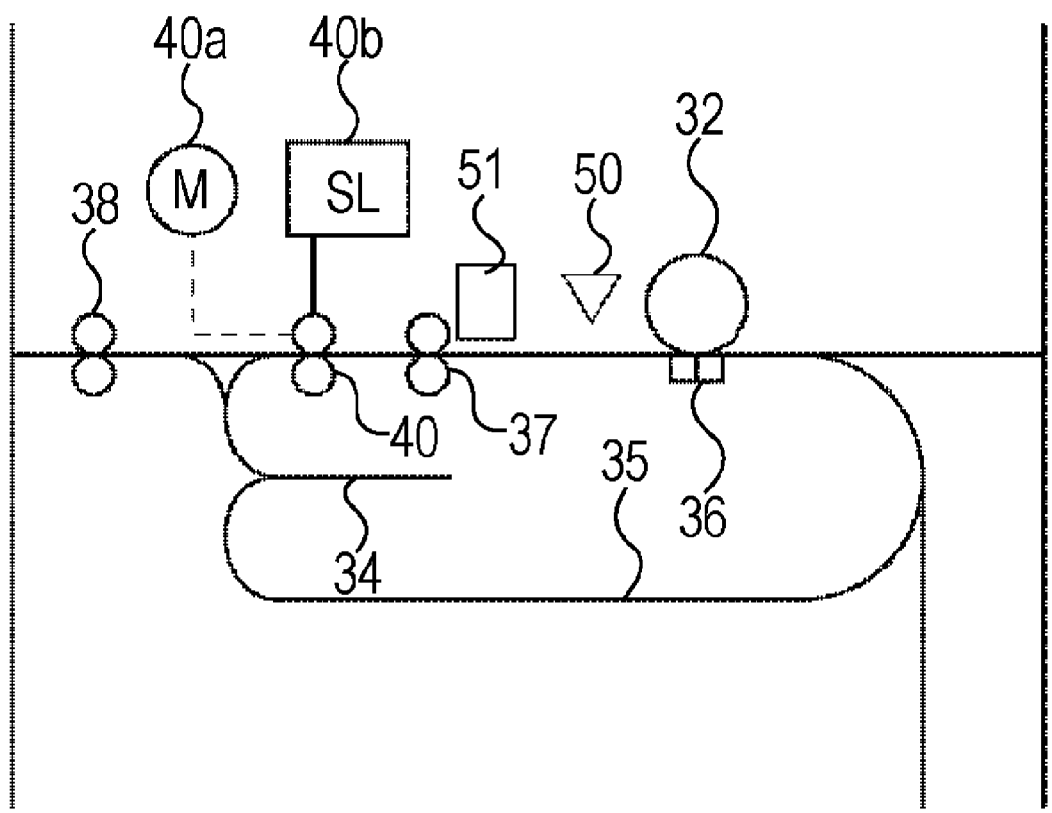
FIG. 4 is a detailed partial view of the image forming apparatus according to an embodiment of the present invention.

FIG. 4 is a detailed view of a part of the image forming apparatus 10 according to an embodiment of the present invention. The illustrated image forming apparatus 10 includes a microphone 51 for sensing sound information, a sensor 50 for detecting the sheet, a feeding motor 40a for driving the feeding rollers 40, and a solenoid 40b for moving the feeding rollers 40 into contact with and away from each other.

Figure 5:
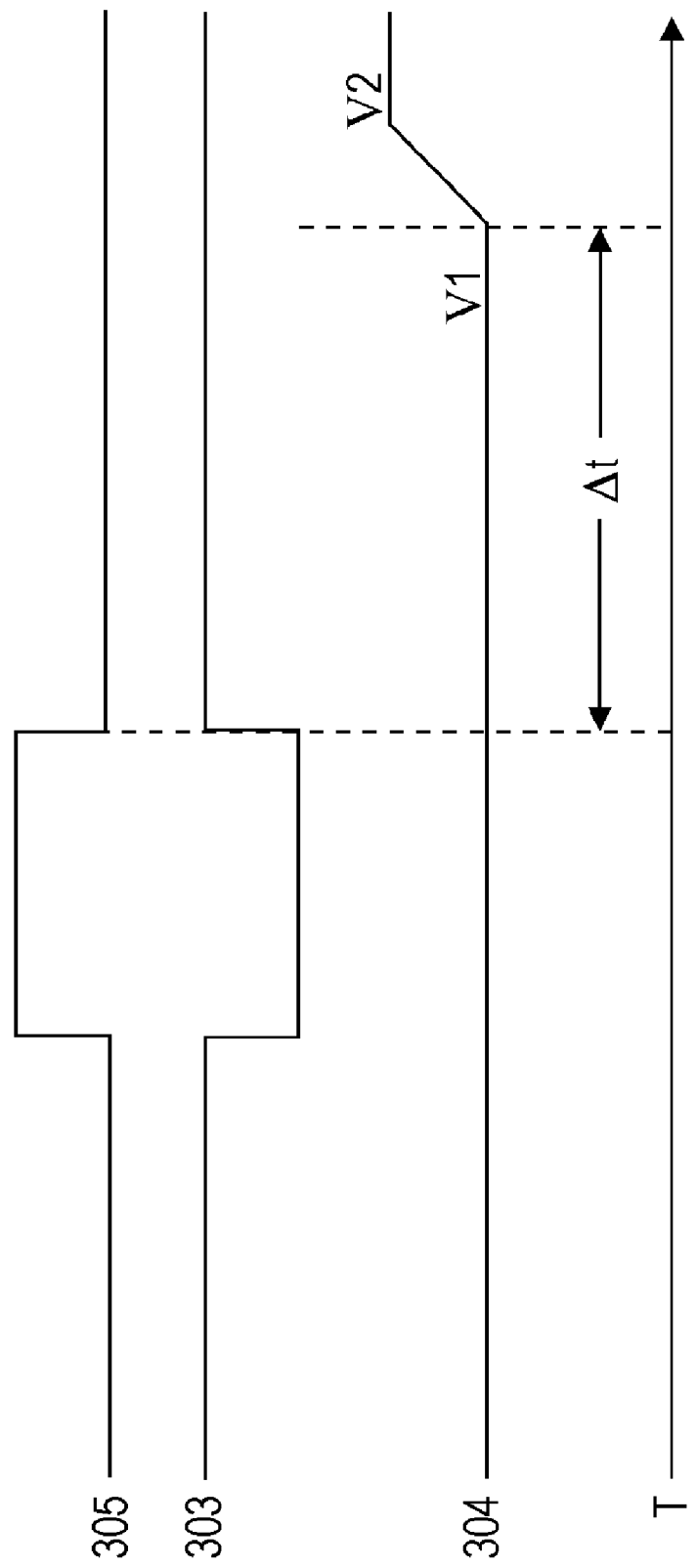
FIG. 5 is an explanatory view showing the operation of the image forming apparatus according to an embodiment of the present invention.

An operation performed until the sheet reaches the finisher 60 via the sensor 50, the fixing unit 37, the feeding rollers 40, and the discharging rollers 38 will be described with reference to FIG. 5. When the sensor 50 detects the leading edge of the sheet, the solenoid 40b is turned off, and the feeding rollers 40 come into contact with each other so as to nip the sheet. When the sensor 50 detects the trailing edge of the sheet after the leading edge reaches the discharging rollers 38, the solenoid 40b is turned on to separate the feeding rollers 40. Further, the speed of the feeding motor 40a is increased from V1 to V2 a predetermined time (Δt) after the trailing edge of the sheet is detected by the sensor 50. This operation is performed by the CPU 200 according to the control program stored in the ROM 202. In this case, sound information about the image forming apparatus 10 is detected during feeding of the sheet.

Figure 6:
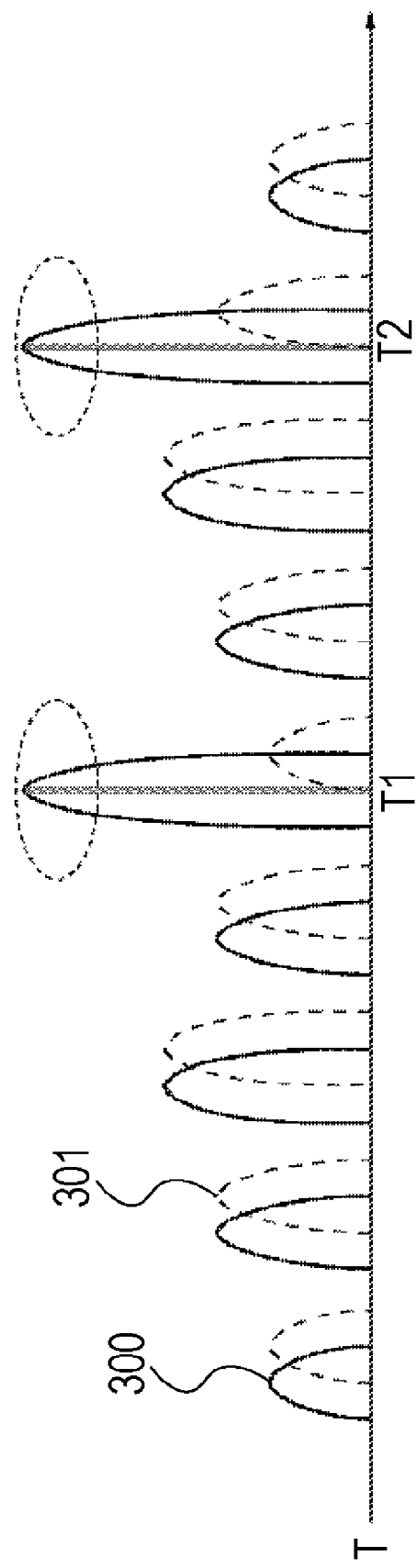
FIG. 6 is an explanatory view showing times at which abnormal sounds are detected according to an embodiment of the present invention.

As shown in FIG. 6, the CPU 200 compares detected sound information 300 with normal sound information 301 which is obtained in a normal image forming operation and which is stored in the RAM 201 or the ROM 202, thereby checking whether the sound information is abnormal. When the difference between the detected sound information 300 and the normal sound information 301 is more than or equal to a predetermined value, the CPU 200 determines that a fault has occurred, and calculates abnormal sound times T1 and T2 on the basis of time information T.

Figure 7:
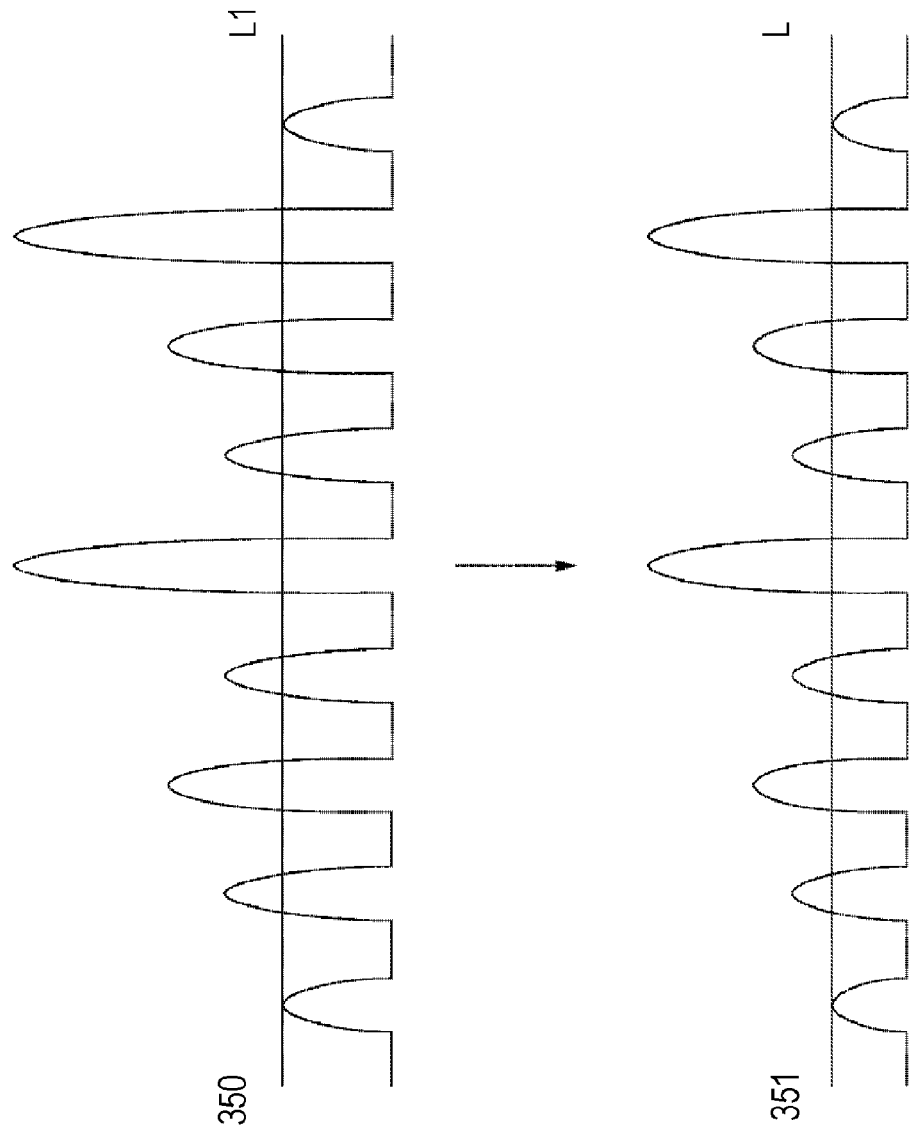
FIG. 7 is an explanatory view showing a shifting process for sound information according to an embodiment of the present invention.

However, external noise may also be detected together with the detected sound information, depending on the operating environment of the image forming apparatus 10. For this reason, as show in FIG. 7, detected sound information 350 may be compared with the normal sound information 301 after the detection level of sound information is entirely shifted so that an average value L1 of the detected sound information 350 becomes equal to a predetermined average value L of sound information 351.

The normal sound information 301 prestored in the RAM 201 or the ROM 202 corresponds to various sheet sizes and various operation modes such as one-sided image recording and double-sided image recording. The detected sound information 300 may be stored as normal sound information in the RAM 201 so as to be compared with newly detected sound information.

Figure 8:
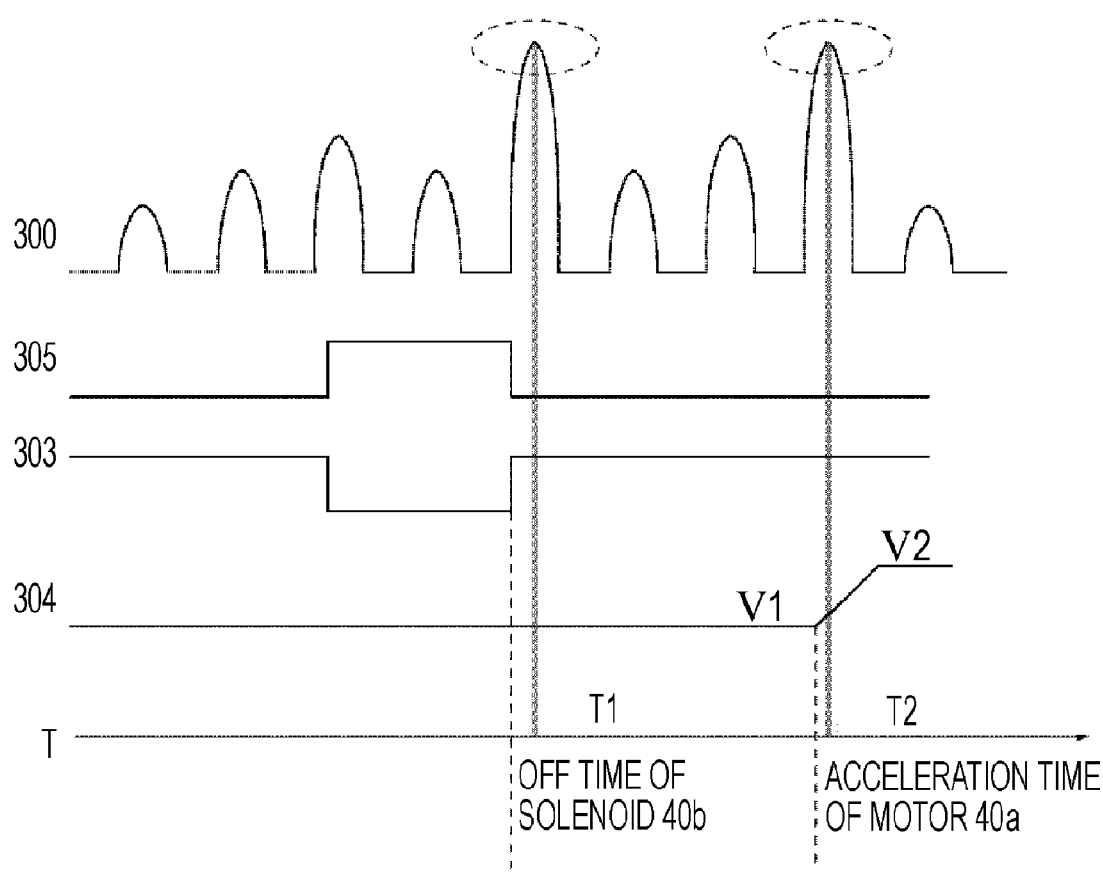
FIG. 8 is an explanatory view showing a process for specifying a position where the abnormal sounds are produced according to an embodiment of the present invention.

As shown in FIG. 8, the CPU 300 specifies a position where an abnormal sound is produced, on the basis of the abnormal sound times T1 and T2, and operation information 303 about the solenoid 40b and speed information 304 about the feeding motor 40a that are prestored in the RAM 201 or the ROM 202.

When the interval between the abnormal sound time T1 and the time at which the solenoid 40b is turned on is within a predetermined time, the CPU 200 determines that the solenoid 40b is faulty. When the interval between the abnormal sound time T2 and the acceleration time of the feeding motor 40a is within a predetermined time, the CPU 200 determines that the feeding motor 40a is faulty.

Figure 9:
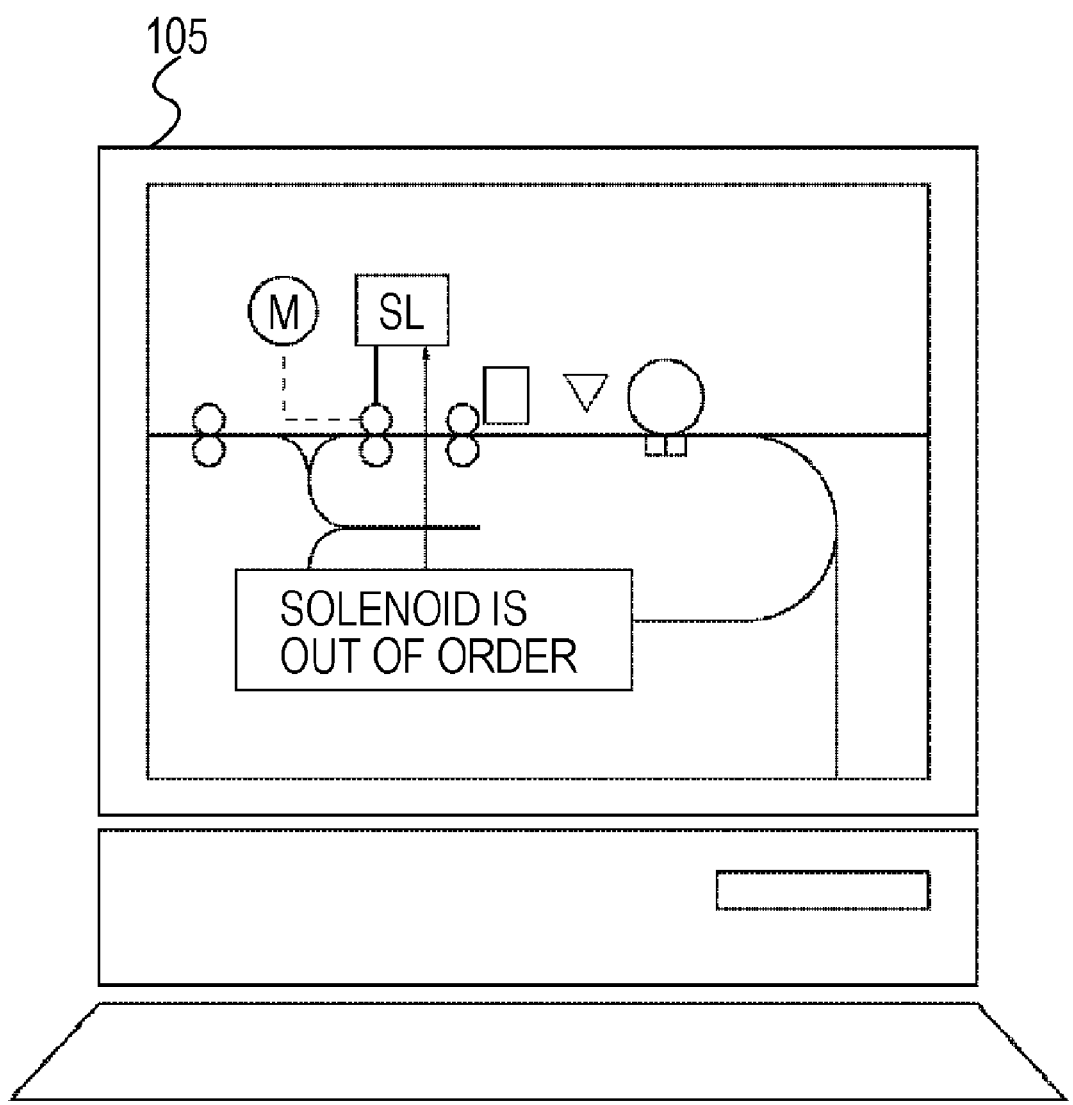
FIG. 9 is an explanatory view of a display device that indicates the location of a fault according to an embodiment of the present invention.

When the fault is located, information about the fault is transmitted to the management apparatus 104 via the public line 102, and is indicated on the display apparatus 105, as shown in FIG. 9. The serviceman performs an on-site service, and repairs the fault by replacing a faulty component with a new component. The fault may be indicated on a display provided in the image forming apparatus 10.

A fault may be located according to another information detected by the sensor 50. For example, when an abnormal sound is caused a predetermined time after the detection of the leading edge of the sheet by the sensor 50 and the leading edge of the sheet is going to reach the rollers at that time, the CPU 200 determines that the rollers or the sheet path near the rollers is faulty.

The normal sound information 301, the operation information 303 about the solenoid 40b, and the speed information 304 about the feeding motor 40a may be stored in the management apparatus 104. Sound information and sensor information detected by the image forming apparatus 10 may be transmitted to the management apparatus 104 in order for the management apparatus 104 to locate the fault.

Instead of detecting the sheet, the sensor 50 may detect information about position information about the load for image formation.

The fault can be more precisely located by thus using the detected sound information 300, the prestored sound information 301, the operation information 303 about the solenoid 40b, the speed information 304 about the feeding motor 40a, and information 305 detected by the sensor 50.

As described above, according to an embodiment of the present invention, it is possible to precisely locate a fault, and to reduce the downtime caused by the fault.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-268690 filed Sep. 15, 2005, which is hereby incorporated by reference herein in its entirety.

What is claimed is:

1. An apparatus comprising:
a memory to store first sound information associated with a normal operating sound produced when an image forming apparatus normally operates;
a sensor to detect an operating sound produced from the image forming apparatus and generate second sound information based on the detected operating sound; and
a locating device to locate a fault in the image forming apparatus based on the first sound information, the second sound information, and operation information associated with the image forming apparatus.

2. The apparatus according to claim 1, wherein the locating device locates the fault after shifting the second sound information such that an average value of the shifted second sound information is within a predetermined value range.

3. The apparatus according to claim 1, wherein the locating device is capable of specifying a time at which an abnormal sound is produced by comparing the first sound information and the second sound information.

4. The apparatus according to claim 3, wherein the locating device specifies a time at which a difference between the first sound information and the second sound information exceeds a predetermined value as the time at which the abnormal sound is produced.

5. The apparatus according to claim 1, wherein the memory stores the first sound information for each size or each operation mode.

6. The apparatus according to claim 1, further comprising:
a display device to indicate the location of the fault determined by the locating device.

7. The apparatus according to claim 1, wherein the operation information includes information about a load for operating the image forming apparatus.

8. The apparatus according to claim 7, wherein the operation information includes information about a speed of a driving device that drives a sheet feeding roller.

9. The apparatus according to claim 7, wherein the operation information includes information about operation of a separation device that separates a pair of sheet feeding rollers.

10. The apparatus according to claim 7, wherein the operation information includes information detected by a sheet sensor that detects a position of a sheet.

11. The apparatus according to claim 1, further comprising:
a transmitting device that transmits information about the fault located by the locating device to a management apparatus connected to the image forming apparatus.

12. The apparatus according to claim 1, wherein the memory stores the second sound information as the normal operating sound, and
wherein the locating device locates the fault by using the stored second sound information as the first sound information.

13. An image forming system comprising:
an image forming apparatus for forming an image on a sheet;
a management apparatus coupled to the image forming apparatus via a network;
a memory to store first sound information associated with a normal operating sound produced when the image forming apparatus normally operates;
a sound sensor to detect an operating sound produced from the image forming apparatus and generate second sound information based on the detected operating sound; and
a locating device to locate a fault in the image forming apparatus based on the first sound information, the second sound information, and operation information associated with the image forming apparatus.

14. The image forming system according to claim 13, wherein the locating device is provided in the image forming apparatus, and
wherein the image forming apparatus includes a notifying device that notifies the management apparatus of the fault located by the locating device.

15. The image forming system according to claim 13, wherein the memory and the locating device are provided in the management apparatus,
wherein the image forming apparatus includes a transmitting device to transmit the second sound information to the management apparatus, and
wherein the locating device locates the fault based on the first sound information and the operation information stored in the management apparatus, and the second sound information transmitted from the transmitting device.

16. The image forming system according to claim 13, wherein the management apparatus includes a display device that indicates the location of the fault determined by the locating device.

17. A method of controlling an image forming apparatus, comprising:
storing first sound information associated with a first operating sound produced when the image forming apparatus operates without a fault;
detecting an operating sound produced from the image forming apparatus and generating second sound information based on the detected operating sound; and
locating a fault in the image forming apparatus based on the first sound information, the second sound information, and operation information associated with the image forming apparatus.

18. The method according to claim 17, further comprising:
shifting the second sound information such that an average value of the second sound information is within a defined range.

19. The method according to claim 17, further comprising:
comparing the first sound information and the second sound information; and
determining an abnormal sound produced time at which a difference between the first sound information and the second sound information exceeds a threshold value.

20. The method according to claim 19, further comprising:
determining a location of the fault based on the abnormal sound produced time; and
displaying the location of the fault.

* * * * *